(12) United States Patent
Park et al.

(10) Patent No.: US 8,473,983 B2
(45) Date of Patent: Jun. 25, 2013

(54) METHOD AND APPARATUS TO PROCESS CUSTOMIZED RECORDING CONTENTS

(75) Inventors: Hong-seok Park, Ansan-si (KR); Ju-hee Seo, Seoul (KR); Seong-hun Jeong, Suwon-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 860 days.

(21) Appl. No.: 12/025,356

(22) Filed: Feb. 4, 2008

(65) Prior Publication Data
US 2009/0055884 A1 Feb. 26, 2009

(30) Foreign Application Priority Data

Aug. 24, 2007 (KR) .................. 10-2007-0085574

(51) Int. Cl.
*G06F 3/00* (2006.01)
(52) U.S. Cl.
USPC ............... 725/46; 725/36; 725/44; 725/45; 725/47; 725/88
(58) Field of Classification Search
None
See application file for complete search history.

(56) References Cited

U.S. PATENT DOCUMENTS

| | | | | |
|---|---|---|---|---|
| 5,513,129 A * | 4/1996 | Bolas et al. | .................. | 703/13 |
| 5,610,653 A * | 3/1997 | Abecassis | .................. | 348/170 |
| 5,798,785 A * | 8/1998 | Hendricks et al. | .............. | 725/46 |
| 6,144,375 A * | 11/2000 | Jain et al. | .................. | 715/251 |
| 6,408,128 B1 * | 6/2002 | Abecassis | .................. | 386/239 |
| 6,675,384 B1 * | 1/2004 | Block et al. | .................. | 725/28 |
| 2003/0014750 A1 * | 1/2003 | Kamen | .................. | 725/25 |
| 2003/0093790 A1 * | 5/2003 | Logan et al. | .................. | 725/38 |
| 2003/0122966 A1 * | 7/2003 | Markman et al. | .............. | 348/563 |
| 2004/0266336 A1 * | 12/2004 | Patsiokas et al. | ........... | 455/3.04 |
| 2007/0055981 A1 * | 3/2007 | Lee | .................. | 725/28 |
| 2008/0092168 A1 * | 4/2008 | Logan et al. | .................. | 725/44 |
| 2008/0235742 A1 * | 9/2008 | Osaki et al. | .................. | 725/100 |

FOREIGN PATENT DOCUMENTS

| | | |
|---|---|---|
| KR | 2005-84264 | 8/2005 |
| KR | 2006-67466 | 6/2006 |

* cited by examiner

*Primary Examiner* — Cai Chen
(74) *Attorney, Agent, or Firm* — Stanzione & Kim, LLP (57) ABSTRACT

A method and apparatus to process customized recording contents includes generating customized replay control information at a time of recording contents. The method also includes extracting broadcasting-associated additional information from a broadcasting stream, extracting user interaction information by matching the extracted additional information with one or more viewing preferences of a user, selectively parsing the broadcasting stream according to the user interaction information to generate stream parsing information, and generating replay control information corresponding to the broadcasting stream based on the user interaction information and stream parsing information.

24 Claims, 10 Drawing Sheets

| TIME | SBS | KBS2 | KBS1 | MBC | EBS |
|---|---|---|---|---|---|
| 6:00 | 00 GO! MORNING WIDE (1st, 2nd) | 00 LIVE, MORNING OF THE WORLD (1st, 2nd) | 00 KBS NEWS PLAZA | 00 MBC NEWS TODAY (1st, 2nd) | 00 10 MINUTES FOR HEALTH <ENJOYABLE AEROBIC EXERCISE, KICK POWER (6)> 10 FAST ENGLISH-WORD LEARNING <SITUATION UNDERSTANDING AND OPINION EXPRESSION> 35 ENGLISH CAFE < HE IS MOONLIGHTING AS A TAXI DRIVER. > [RE] |
| | 30 GO! MORNING WIDE (3rd) | | 00 BRITISH OPEN GOLF | 50 BE WITH ME (71) [15][HD] | 00 JINNI IN STRANGE WORLD <DON'T CRY, BABY/TO BE RICH> [RE] |

< EPG >

OR

07:01:21.543  Tiger Woods shows on the ground
07:01:26.262  Tiger Woods T shot in hole 1
07:01:30.455  Tiger Woods's approaching shot
. . .

< <SCENE DESCRIPTION> >

METHOD AND APPARATUS TO PROCESS CUSTOMIZED RECORDING CONTENTS

CROSS-REFERENCE TO RELATED APPLICATIONS

This application claims priority under 35 U.S.C. §119(a) from Korean Patent Application No. 10-2007-0085574, filed on Aug. 24, 2007, in the Korean Intellectual Property Office, the disclosure of which is incorporated herein in its entirety by reference.

BACKGROUND OF THE INVENTION

1. Field of the Invention

The present general inventive concept relates to a digital broadcast receiving system with a personal video recorder (PVR) function, and more particularly, to a method and apparatus to process customized recording contents by generating customized replay control information at a time of recording contents.

2. Description of the Related Art

With increasing development in digital video/audio compression and digital transmission technologies, digital broadcasting systems can provide high-quality image services compared to analog broadcasting systems. In particular, a digital broadcasting system can transmit multiplexed broadcast programs in a same bandwidth and improve interoperability between digital communications media and digital storage media.

A digital broadcasting system multiplexes a plurality of broadcast programs encoded in MPEG and transmits the broadcast programs in a transport stream format.

A digital broadcasting receiver extracts video/audio information and program information from the transport stream. Thus, a user can select a desired broadcast program.

As well as having a broadcast receiving function, digital broadcasting receivers also now have a personal video recorder (PVR) function. With the PVR function, the user can store video/audio streams of broadcast programs in a non-recovered or recovered format in the storage media and replay the broadcast programs stored in the storage media according to a user's request.

For example, unlike a real-time broadcasting stream, contents recorded in a PVR can be replayed in various speed-variable replay modes such as a normal replay mode, a fast forward replay mode, and a pause mode according to a user's manipulation.

However, similar to a conventional VCR, the user needs to repeatedly manipulate a plurality of keys on a front panel or a remote controller so as to replay the recorded contents in the various speed-variable replay modes.

For example, the user may press a rewind key to move to a desired scene. When the user cannot stop at the desired scene, the user presses the fast forward key to move to a scene close to the desired scene. In addition, when the user desires to watch a previous scene in a slow motion mode, the user has to manipulate a key relating to a slow motion mode.

Therefore, repeatedly manipulating a plurality of keys to operate functions of a conventional PVR is inconvenient for a user.

SUMMARY OF THE INVENTION

The present general inventive concept provides a method and apparatus to process customized recording contents by generating customized replay control information at a time of recording contents in a personal video recorder (PVR).

Additional aspects and utilities of the present general inventive concept will be set forth in part in the description which follows and, in part, will be obvious from the description, or may be learned by practice of the general inventive concept.

The foregoing and/or other aspects and utilities of the general inventive concept may be achieved by providing a method of processing recording contents, the method including extracting broadcasting-associated additional information from a broadcasting stream, extracting user interaction information by matching the extracted broadcasting-associated additional information with one or more viewing preferences of a user, selectively parsing the broadcasting stream according to the user interaction information, and generating replay control information for the broadcasting stream based on the user interaction information and stream parsing information.

The foregoing and/or other aspects and utilities of the general inventive concept may also be achieved by providing an apparatus to process recording contents including a program information extraction unit to extract EPG (electronic program guide) information and metadata from a broadcasting stream, a user viewing behavior analyzing unit to generate a stream analyzing command based on user interaction by matching manipulation information of the user with program-associated information extracted by the program information extraction unit, a stream analyzing unit to generate scene analyzing information by selectively parsing the broadcasting stream according to the stream analyzing command generated by the user viewing behavior analyzing unit, and a control-information generating unit to generate replay control information for the broadcasting stream by matching the scene analyzing information of the stream analyzing unit with the stream analyzing command of the user viewing behavior analyzing unit.

Customized contents can be provided to a user in a broadcasting stream by performing a speed-variable replay mode according to a replay mode of the user. Therefore, the user can watch the contents in real time or perform the customized speed-variable replay modes for the contents stored in a storage media.

The foregoing and/or other aspects and utilities of the general inventive concept may also be achieved by providing a personal video recording apparatus including a personal video recording unit to record content information, and a processing unit to process customized content information corresponding to the recorded content information, wherein the customized content information is processed by generating customized replay control information while the content information is being recorded.

The foregoing and/or other aspects and utilities of the general inventive concept may also be achieved by providing a method of processing customized recording contents, the method including receiving content information, extracting one or more of EPG information and metadata from the received content information, analyzing user viewing behavior using at least one of the EPG information and one or more preferences of a viewing behavior of a user to generate user interaction information, analyzing a video/audio stream of at least one of the received content information and the metadata according to a stream analyzing command based on the user interaction information, and generating replay control information.

The replay control information may be generated based on at least one of a user preference using the video/audio stream information and the user interaction information, and by matching the analyzed metadata with the user interaction information.

The method may further include separately storing the content information and the replay control information in a storage medium.

The content information may include a format of a broadcasting stream encoded in MPEG.

The user viewing behavior may be analyzed using at least one of a statistical framework and a rule-based framework, each based on a history of programs previously watched by the user.

A computer-readable recording medium having embodied thereon a computer program to execute a method, wherein the method includes receiving content information, extracting one or more of EPG information and metadata from the received content information, analyzing user viewing behavior using at least one of the EPG information and one or more preferences of a viewing behavior of a user to generate user interaction information, analyzing a video/audio stream of at least one of the received content information and the metadata according to a stream analyzing command based on the user interaction information, and generating replay control information.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to embodiments of the present general inventive concept, examples of which are illustrated in the accompanying drawings, wherein like reference numerals refer to the like elements throughout. The embodiments are described below in order to explain the present general inventive concept by referring to the figures.

Figure 1:
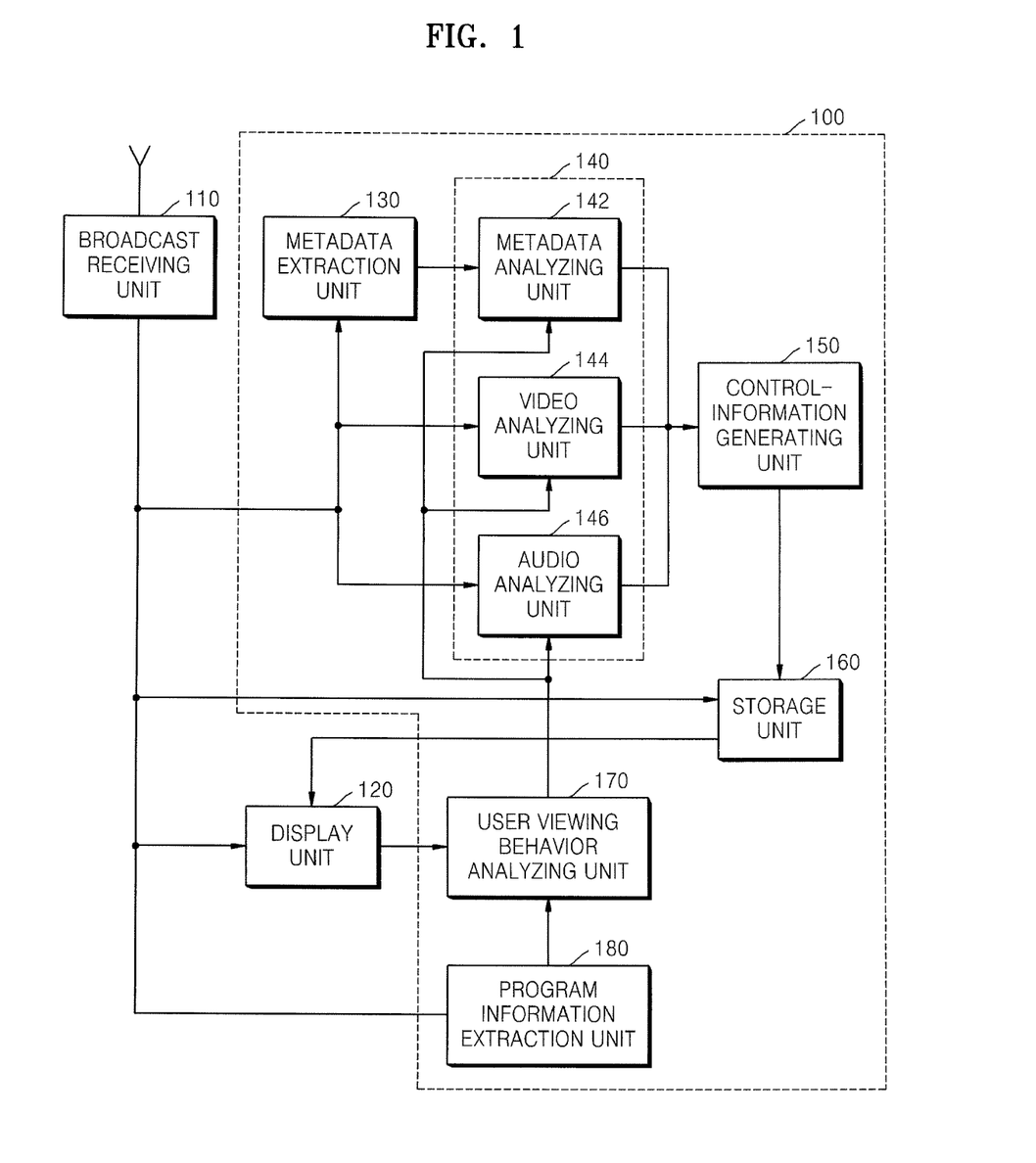
FIG. 1 is a block diagram illustrating an apparatus to process recording contents, according to an embodiment of the present general inventive concept.

FIG. 1 is a block diagram illustrating an apparatus to process recording contents according to an embodiment of the present general inventive concept.

Referring to FIG. 1, the apparatus to process recording contents according to an embodiment of the present general inventive concept includes a personal video recorder (PVR) unit 100, a broadcast receiving unit 110, and a display unit 120. The PVR unit 100 includes a metadata extraction unit 130, an EPG extraction unit 180, a stream analyzing unit 140, a control-information generating unit 150, a storage unit 160, and a user viewing behavior analyzing unit 170. The stream analyzing unit 140 includes a metadata analyzing unit 142, a video analyzing unit 144, and an audio analyzing unit 146.

The broadcast receiving unit 110 receives a broadcasting stream in a transport stream format encoded in MPEG through an antenna. This broadcasting stream includes video data, audio data, and electronic program guide (EPG) information/metadata. The broadcast receiving unit 110 separates the broadcasting stream into video, audio, and EPG information/metadata streams.

The display unit 120 decodes the separated video stream from the broadcast receiving unit 110 and displays the decoded video stream, or displays contents recorded in the storage unit 160.

The metadata extraction unit 130 extracts metadata from the broadcasting stream received in the broadcast receiving unit 110. The metadata may include description information of a current scene, a type of contents of a current scene, explanation for each scene, person information and the like.

The program information extraction unit 180 extracts broadcast program information such as the EPG information or the metadata from the broadcasting stream received in the broadcast receiving unit 110. The EPG information may include a program title, a date, recording time, data size and the like.

The user viewing behavior analyzing unit 170 extracts user interaction information by matching preferences of viewing behavior analyzed based on past manipulation information of the user in the display unit 120 with the EPG information extracted by the program information extraction unit 180 or the metadata, then generates a broadcasting stream analyzing command based on the user's interaction information. For example, when a broadcast time is "07:00 to 08:00", a program title is "golf relay", manipulation information is "in swing scene in a golf program, repeat viewing several times in a slow motion mode" and "skip a walking scene in a golf program", the broadcasting stream analyzing command generates "skip the scene from 07:00:00 to 07:01:26".

At this time, the user viewing behavior analyzing unit 170 automatically extracts a preference value of viewing behavior by analyzing a user's interaction habits (for example, store, fast forward, rewind, pause, summary view, etc.) for programs using a well-known preference analyzing algorithm such as statistical framework, rule-based framework or the like.

The stream analyzing unit 140 selectively parses the broadcasting stream according to the broadcasting stream analyzing command generated by the user viewing behavior analyzing unit 170 and then generates scene analyzing (parsing) information.

As described above, the stream analyzing unit 140 includes the metadata analyzing unit 142, the video analyzing unit 144, and the audio analyzing unit 146.

The metadata analyzing unit 142 selectively analyzes scene description information according to the broadcasting stream analyzing command, thereby generating metadata analyzing information. For example, the metadata analyzing unit 142 extracts only swing scene information according to the broadcasting stream analyzing command to extract swing scene information.

The video analyzing unit 144 selectively analyzes the video stream according to the broadcasting stream analyzing command, thereby generating video analyzing information. For example, the video analyzing unit 144 may repeat images of the swing scene in the slow motion mode according to the broadcasting stream analyzing command to slowly repeat the swing scene. The audio analyzing unit 146 selectively analyzes an audio stream according to the broadcasting stream analyzing command, thereby generating audio analyzing information. For example, the audio analyzing unit 146 may repeat a swing scene with a swing sound in a slow motion mode according to the broadcasting stream analyzing command to slowly repeat the swing scene with the swing sound.

The control-information generating unit 150 generates replay control information by matching the video analyzing information, the audio analyzing information, the metadata analyzing information, and the broadcasting stream analyzing command in the stream analyzing unit 140. For example, the control-information generating unit 150 may generate replay control information related to a skip in the golf program by matching the video and audio analyzing information corresponding to "skip a scene from 07:00:00 to 07:01:26" with the respective skip information command.

The storage unit 160 stores the replay control information generated by the control-information generating unit 150 as a separate file while storing contents received in the broadcast receiving unit 110, and when there is a request to replay contents, provides the replay control information to the display unit 120.

Figure 2:
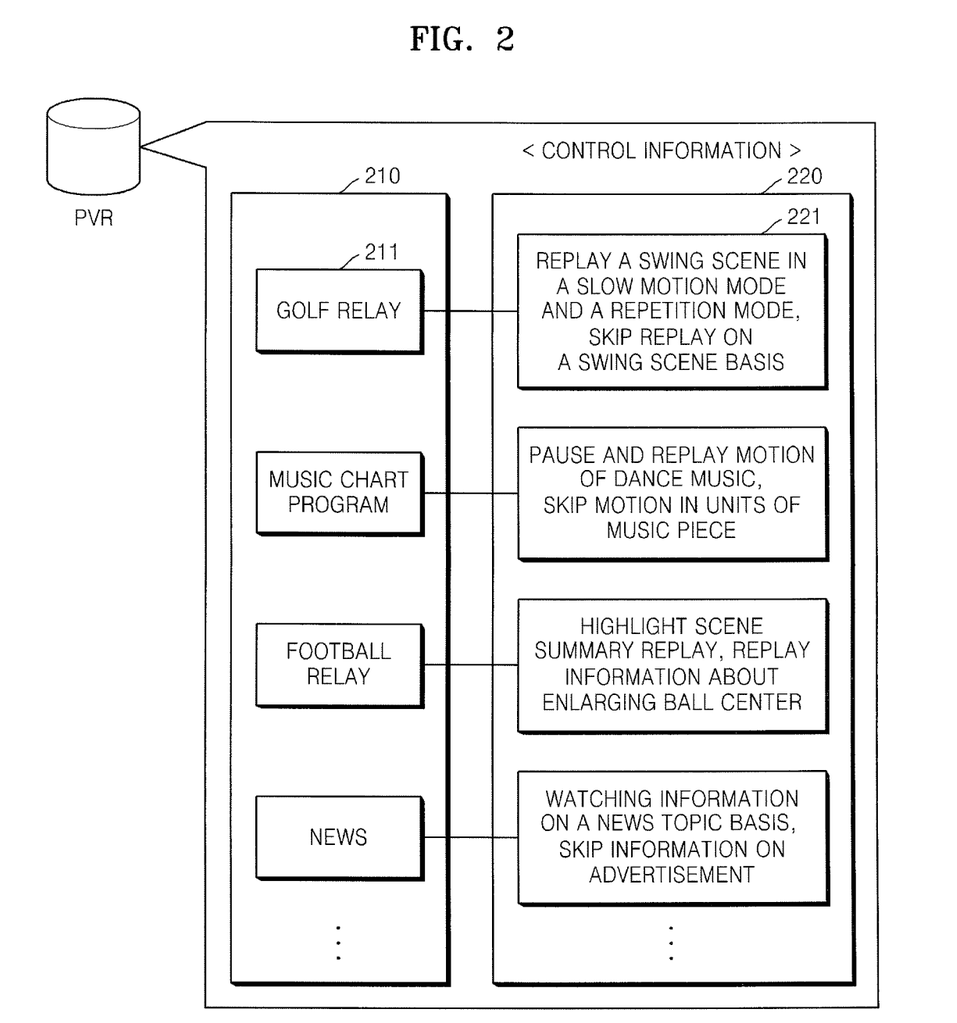
FIG. 2 illustrates a format of content stored in a PVR unit of the apparatus of FIG. 1 according to an embodiment of the present general inventive concept.

FIG. 2 illustrates a format of contents stored in the PVR unit 100 of FIG. 1, according to an embodiment of the present general inventive concept.

The format of FIG. 2 is a format in which content elements 210 and replay control information 220 related to the contents are linked. For example, contents corresponding to "golf relay" 211 may be linked to control information such as "play a swing scene in a slow motion mode and a repetition mode" and "skip replay on a swing scene basis" 221. Therefore, when a user selects "golf relay," a golf swing scene is automatically speed-variable replayed.

Figure 3A:
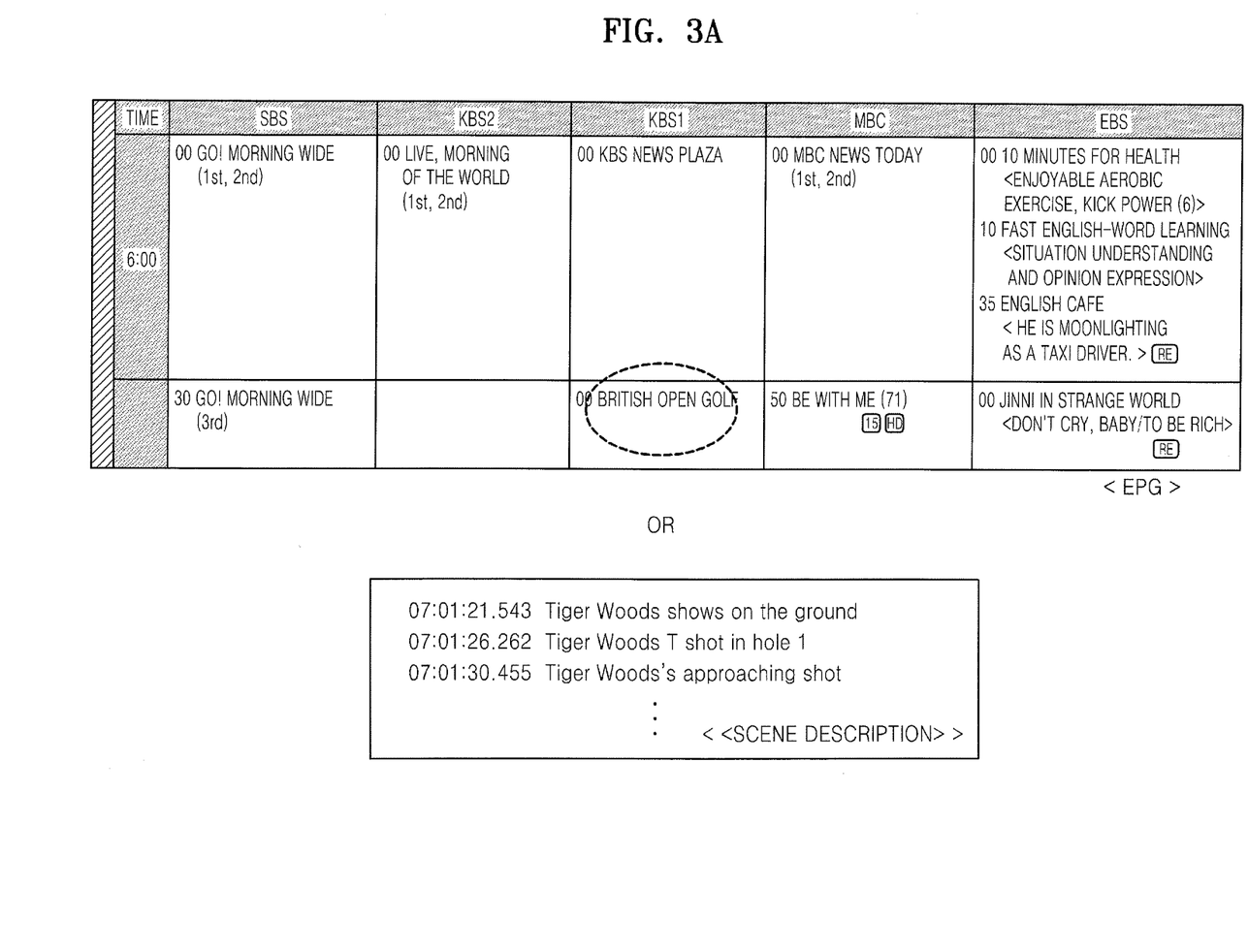
FIGS. 3A to 3C are diagrams illustrating a method of generating a stream analyzing command according to an embodiment of the present general inventive concept.
Figure 3B:
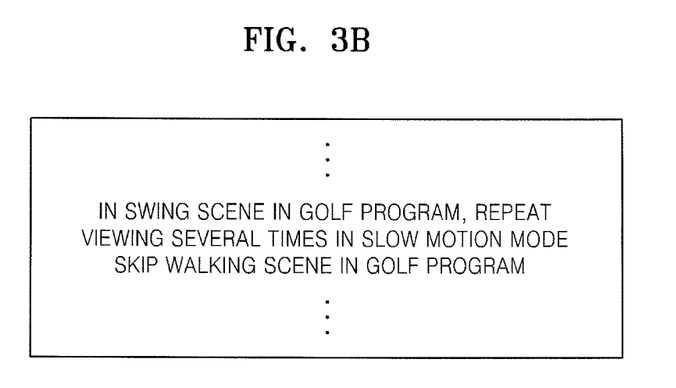
Figure 3C:
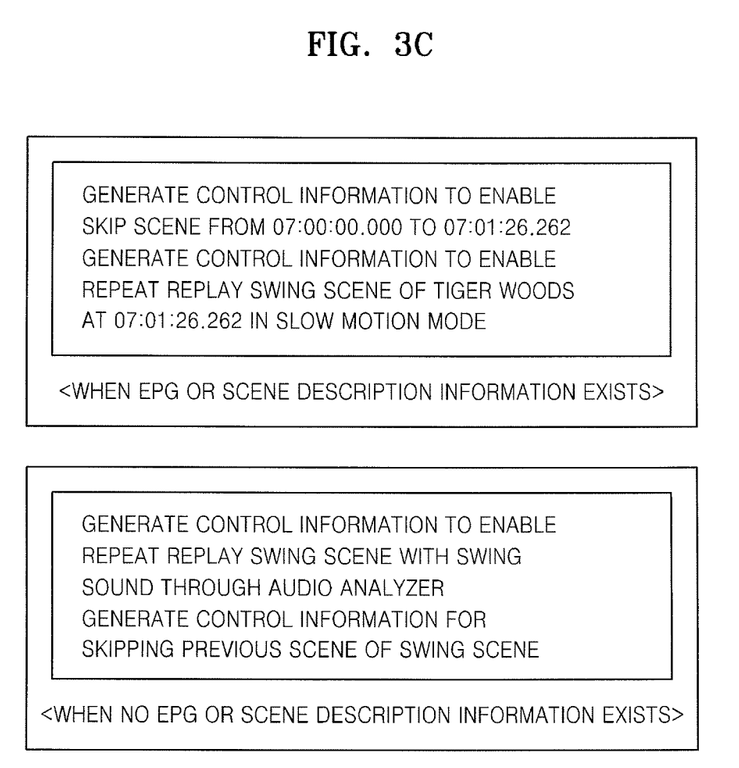

FIGS. 3A to 3C are diagrams illustrating a method of generating a stream analyzing command in the user viewing behavior analyzing unit 170 of FIG. 1, according to an embodiment of the present general inventive concept.

It is assumed that a user receives golf related contents.

Referring to FIG. 3A, a broadcasting receiver receives EPG information or metadata (scene description information) in addition to the contents.

For example, the EPG information may include a channel number and broadcast time of a golf program such as "British Open golf relay", and the metadata may include detailed description information of scenes of the golf program.

Referring to FIG. 3B, it is assumed that, the broadcasting receiver analyzes viewing behavior as "in swing scene in a golf program, repeat viewing several times in a slow video mode" and "skip a walking scene in a golf program."

Then, when the EPG information or the metadata (scene description information) is included in a broadcasting stream, control information corresponding to a broadcasting stream analyzing command is generated based on the user interaction information by matching results of viewing behavior analysis with the EPG information or the scene description information.

For example, referring to FIG. 3C, when the EPG information or the metadata (scene description information) is included in a broadcasting stream, control information is generated to enable the "skip the scene from 07:00:00 to 07:01:26".

Also, referring to FIG. 3C, when the EPG information or the scene description information is not included in the broadcasting stream, control information is generated by the audio analyzing unit 146 to enable the swing scene with swing sound repeated in a slow motion mode.

Figure 4:
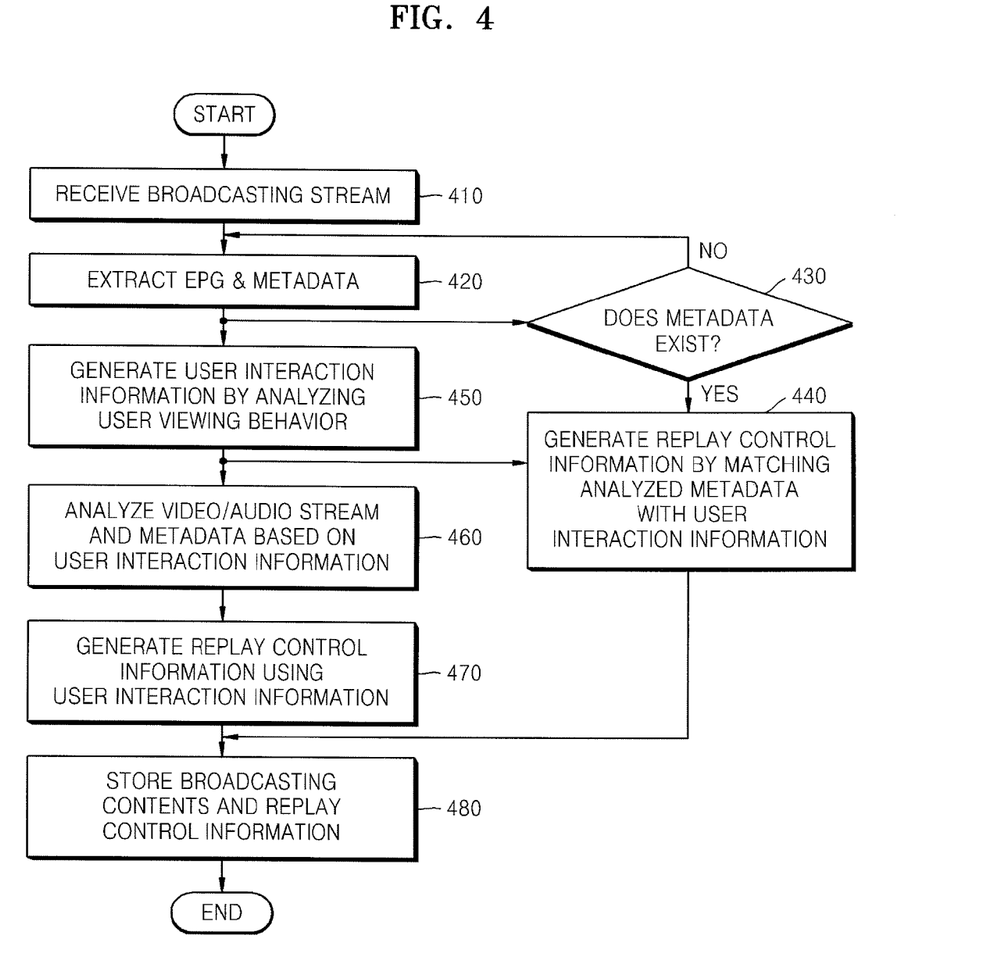
FIG. 4 is a flowchart illustrating a method of processing customized recording contents according to an embodiment of the present general inventive concept.

FIG. 4 is a flowchart illustrating a method of processing customized recording contents, according to an embodiment of the present general inventive concept.

Contents are received in a format of a broadcasting stream encoded in MPEG (operation 410).

EPG information and metadata are extracted from the contents of the received broadcasting stream (operation 420).

Here, user interaction information is generated by analyzing user viewing behavior using the EPG information and preferences of the user viewing behavior (operation 450). The user viewing behavior is analyzed using statistical framework, rule-based framework or the like based on a history of programs previously watched by the viewer.

A video/audio stream of the received broadcasting stream and the metadata are analyzed according to a stream analyzing command based on the user interaction information (operation 460).

Alternatively, when metadata is determined to be included in the received broadcasting stream (operation 430), replay control information is generated by matching the analyzed metadata with the user interaction information (operation 440).

Replay control information depending on at least one user preference is generated by using the video/audio stream information and the user interaction information (operation 470).

Broadcasting contents and the replay control information are separated to be stored in a storage medium (operation 480).

Figure 5:
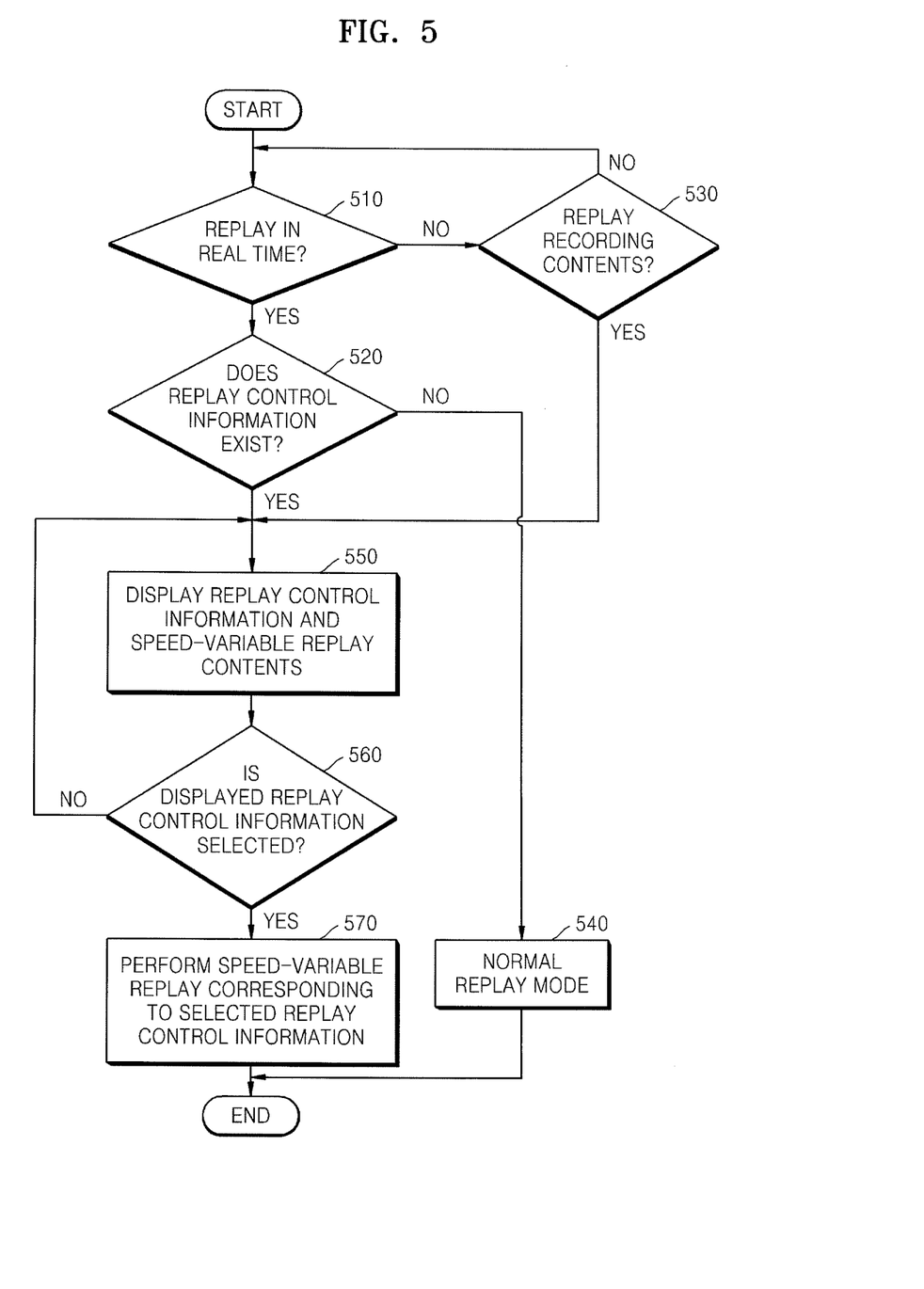
FIG. 5 is a flowchart illustrating a replay mode of customized recording contents according to an embodiment of the present general inventive concept.

FIG. 5 is a flowchart illustrating a replay mode of customized recording contents, according to an embodiment of the present general inventive concept.

Referring to FIG. 5, whether contents are viewed in real time is determined (operation 510).

If the contents are viewed in real time, whether replay control information is included in the currently-viewed contents is determined (operation 520).

If a determination is made that replay control information with respect to the currently-viewed contents is included in a storage medium, the replay control information is displayed on the screen while the contents are speed-variable replayed according to the replay control information linked thereto (operation 550). If a determination is made that replay control information with respect to the currently-viewed contents is not included in a storage medium, contents are replayed in a normal replay mode (operation 540).

Alternatively, if a determination is made that the contents are not replayed in real time, whether a request to replay recording contents exists is determined (operation 530). If a determination is made that there is a request to replay recording contents, the replay control information is displayed on the screen while corresponding contents are speed-variable replayed according to the replay control information linked thereto (operation 550).

Whether the displayed replay control information is selected is determined (operation 560).

Contents corresponding to the selected replay control information are speed-variable replayed (operation 570).

In another embodiment, contents corresponding to the displayed replay control information are automatically speed-variable replayed independently of selecting the replay control information.

Figure 6:
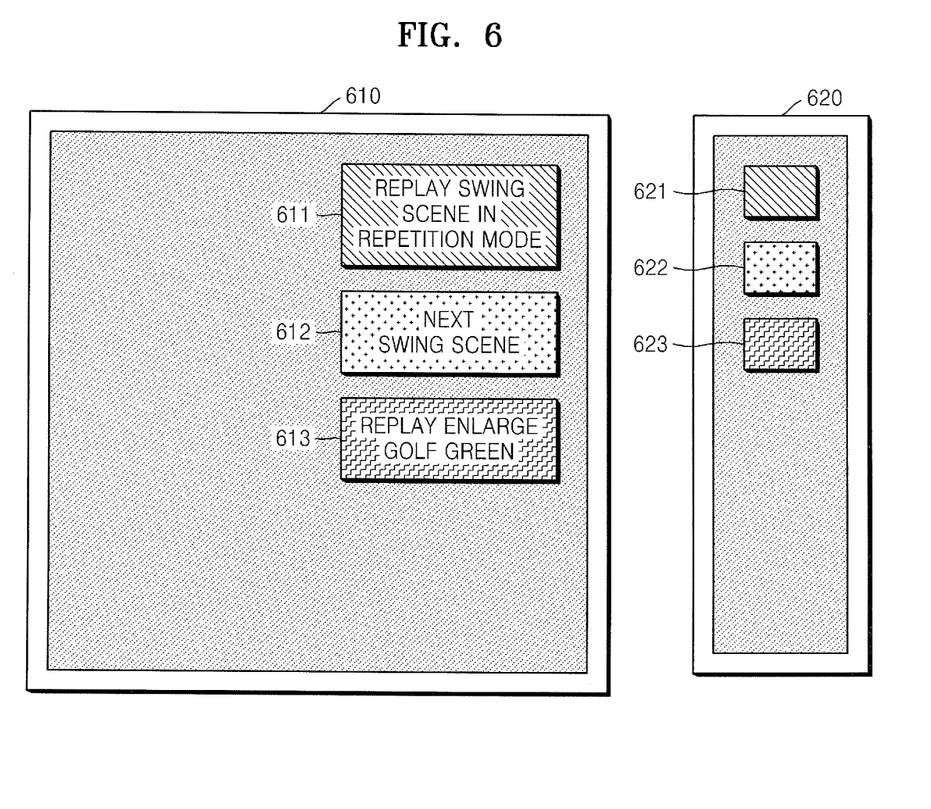
FIG. 6 is a scene displaying replay control information according to an embodiment of the present general inventive concept.

FIG. 6 is a scene displaying replay control information according to an embodiment of the present general inventive concept.

Referring to FIG. 6, replay control information 611, 612, and 613 related to various speed-variable replay modes linked to original video are displayed on a screen 610 of a display apparatus in real time while displaying the video. Further, the replay control information 611, 612, and 613 related to various speed-variable replay modes linked to original video is also displayed on a screen 620 of a remote controller in a real time mode while displaying the video.

Figure 7:
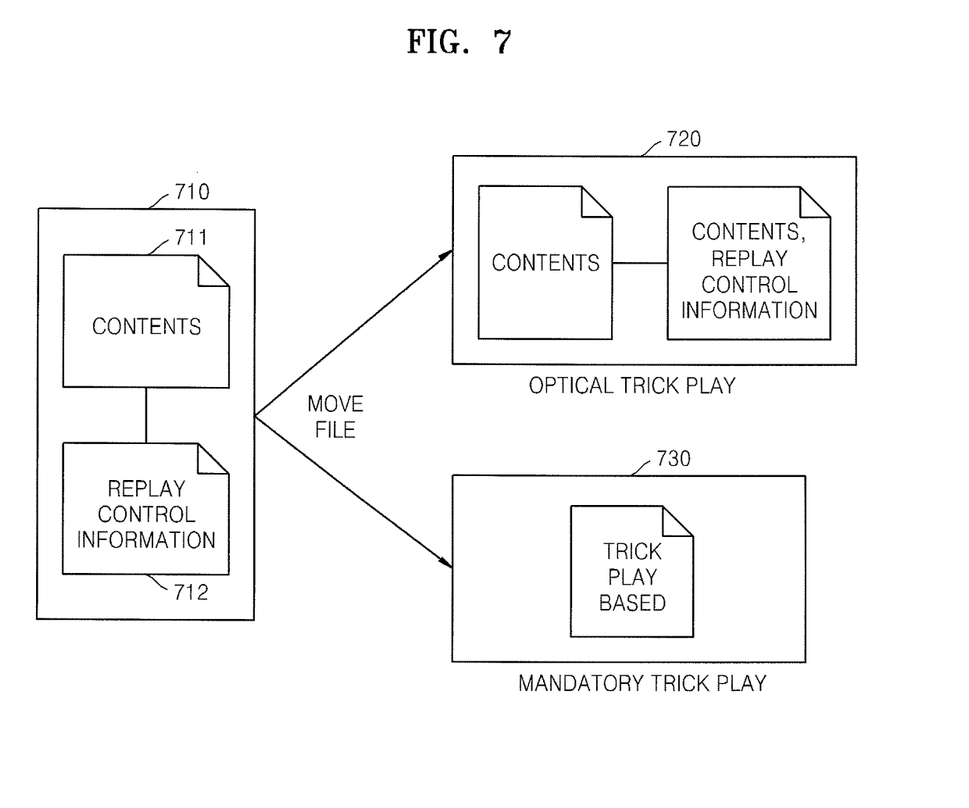
FIG. 7 is a diagram illustrating a method of moving a file when moving replay control information and contents to another apparatus according to an embodiment of the present general inventive concept.

FIG. 7 is a diagram illustrating a method of moving a file when moving replay control information and contents to another apparatus according to an embodiment of the present general inventive concept.

Referring to FIG. 7, the file 710 includes contents 711 and replay control information 712.

The file 710 can be moved to another apparatus using one of two methods according to embodiments of the present general inventive concept.

In one embodiment, the file 710 is moved in a file format 720 having the same format as that of the file 710, that is, the contents and the replay control information are separated from each other. However, in the one embodiment, when the other apparatus can not recognize the replay control information, speed-variable replay of the contents is impossible.

In an other embodiment, a re-authoring operation is performed for corresponding contents according to the customized replay control information before moving the contents. In the re-authoring operation, for example, the contents are edited to be repeatedly replayed in a section where repeatable replay control information exists. Contents 730 generated by the re-authoring operation do not have separate replay control information. Further, there is no dependency on the apparatus.

Figure 8:
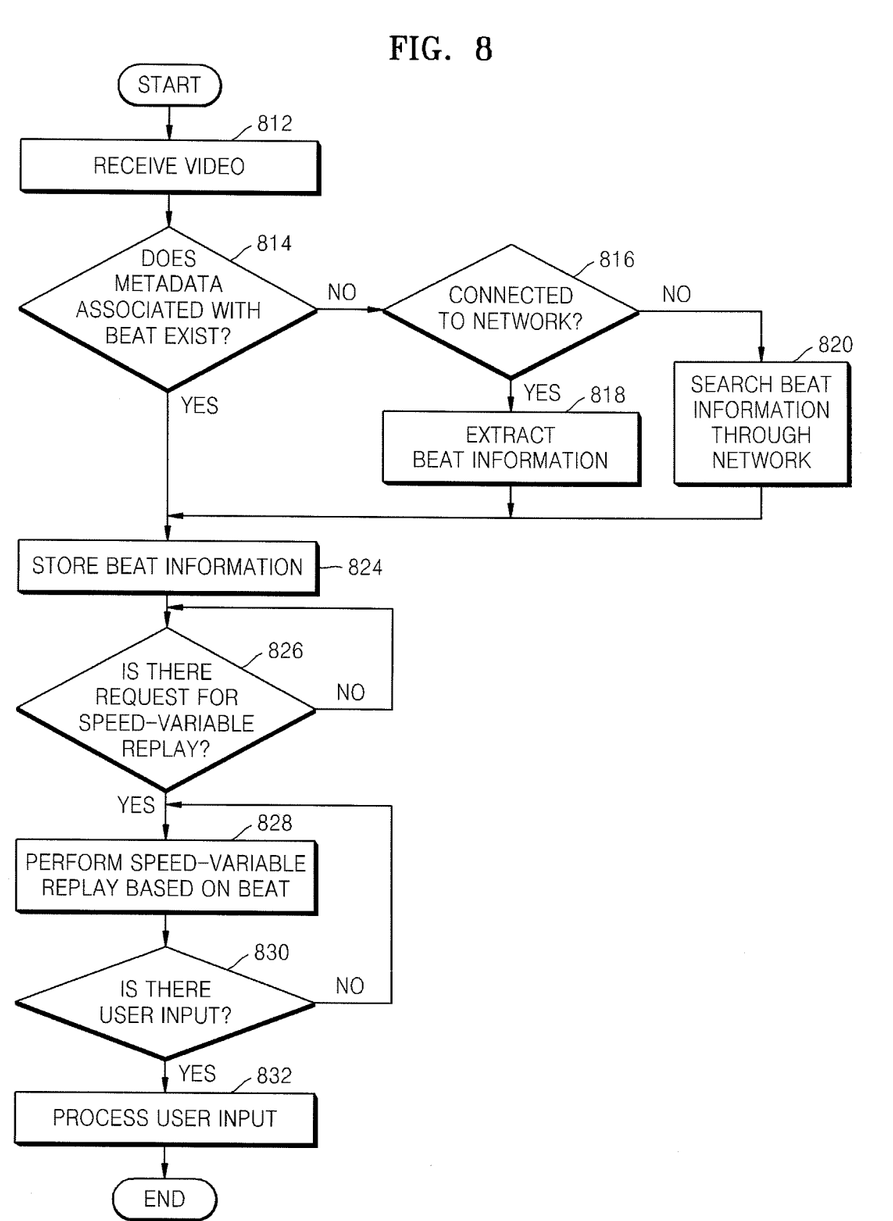
FIG. 8 is a flowchart illustrating a method of processing customized contents according to another embodiment of the present general inventive concept.

FIG. 8 is a flowchart illustrating a method of processing customized contents, according to an embodiment of the present general inventive concept.

Music contents such as dance video are received through a wire/wireless cable or a broadcasting station (operation 812).

Whether metadata related to a beat is included in the received video is determined (operation 814). If no metadata related to a beat is included in the received video, a network is connected (operation 816) and beat information of the video is searched in the network (operation 820).

However, when the network is not connected, the beat is extracted by analyzing the received video (operation 818). For example, the beat can be automatically calculated by analyzing waveforms of the video.

The extracted beat information is stored (operation 824). The stored beat information can be displayed on a LCD or the like.

When the user requests the speed-variable replay, the music contents are speed-variable replayed in units of a beat (operation 828).

Whether a user key input exists is determined (operation 830). If a user key input exists, the speed-variable replay is interrupted, and a function corresponding to the user key input is processed (operation 832).

Figure 9:
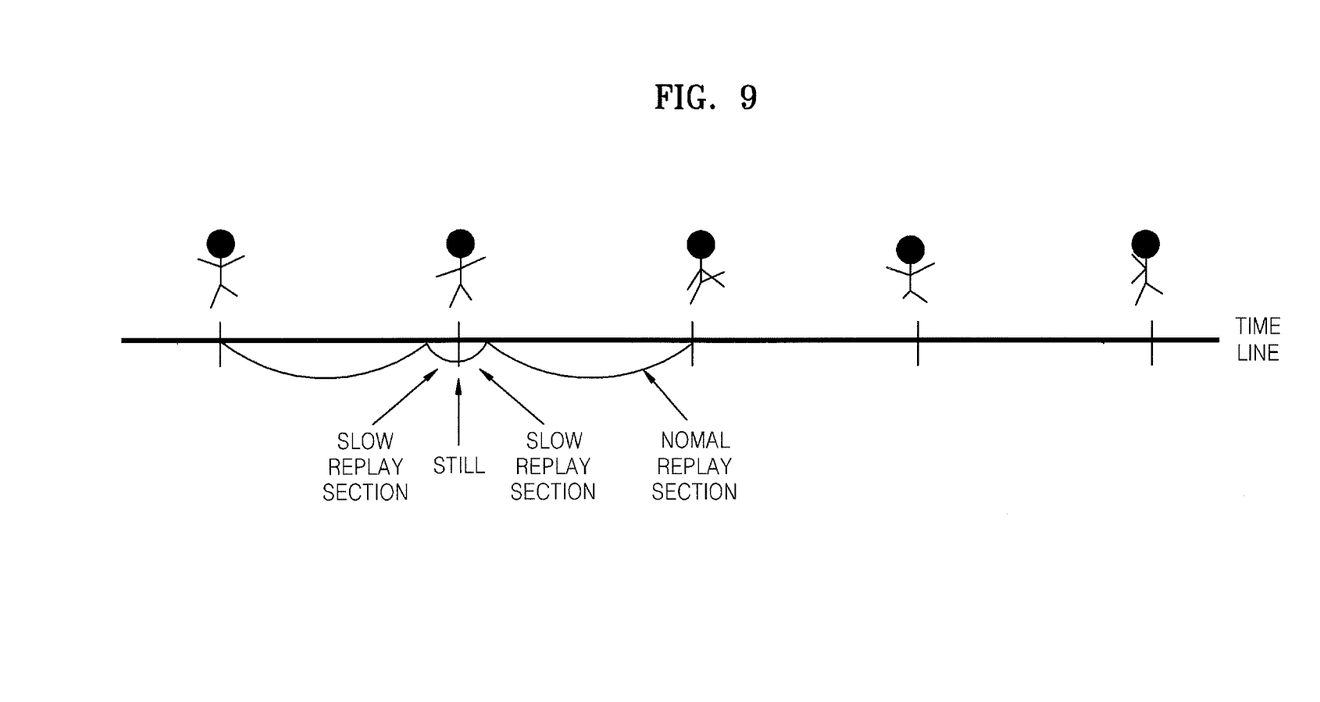
FIG. 9 is a conceptual diagram illustrating a method of processing customized contents of FIG. 8 according to an embodiment of the present general inventive concept.

FIG. 9 is a conceptual diagram illustrating a method of processing customized contents of FIG. 8 according to an embodiment of the present general inventive concept.

Referring to FIG. 9, the customized contents of FIG. 8 are motions of dance music in this case. Typically, motions of dance music are identified in units of a beat.

Therefore, the motions of dance music are replayed in a still state mode for several seconds according to beat information, and after some period of time the motions of dance music are replayed in a normal replay mode.

As required, the motions of dance music may be naturally seen to be connected with each other by using a slow motion mode.

A user can dance while naturally watching sections of the motions without any other key inputs after inputting the speed-variable replay mode.

As needed, when a user key input exists, the user key input is processed.

The present general inventive concept can also be embodied as computer-readable codes on a computer-readable medium. The computer-readable medium can include a computer-readable recording medium and a computer-readable transmission medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although various embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. A method of processing recording contents, the method comprising:
    extracting broadcasting-associated additional information from contents in a broadcasting stream;
    extracting user interaction information by matching the broadcasting-associated additional information in the broadcasting stream with one or more viewing preferences of a user and by generating a stream analyzing command to analyze an video/audio stream and a metadata by matching results of viewing behavior analysis with the video/audio stream or the metadata;
    selectively parsing the broadcasting stream according to the user interaction information to generate scene analyzing information; and
    automatically generating replay control information to control a plurality of modes without a user's input depending on at least one user preference for a to-be-recorded broadcasting stream based on the user interaction information and the scene analyzing information.

2. The method of claim 1, further comprising:
    storing the replay control information and the corresponding broadcasting stream.

3. The method of claim 2, wherein the replay control information and the corresponding broadcasting stream are stored separately.

4. The method of claim 2, further comprising:
    storing an edited broadcast program according to the replay control information.

5. The method of claim 1, wherein the broadcasting-associated additional information comprises:
    EPG (electronic program guide) information and metadata information.

6. The method of claim 1, wherein the replay control information for the broadcasting stream is linked to a corresponding video/audio signal.

7. The method of claim 1, further comprising:
    automatically speed-variable replaying contents linked to the replay control information according to the replay control information at a time of replaying the contents and displaying the linked replay control information in real time.

8. The method of claim 1, wherein the replay control information is displayed on a screen of a display apparatus in real time while a broadcasting signal is replayed.

9. The method of claim 1, wherein when the user requests the contents in the broadcasting stream to be replayed, the replay control information is displayed on a screen as additional information.

10. The method of claim 1, further comprising:
extracting music beat information from the contents;
storing the contents and the music beat information; and
replaying music contents in units of a beat according to a speed-variable replay request.

11. The method of claim 10, wherein the music beat information is extracted from metadata of the music contents or a network.

12. The method of claim 10, wherein the music beat information is extracted by analyzing waveforms of the music contents.

13. The method of claim 10, wherein the replaying of the music contents comprises:
maintaining a pause state for a predetermined time interval in units of a beat according to the extracted music beat information and then processing a next replay section in a normal replay mode.

14. An apparatus to process recording contents, the apparatus comprising:
a program information extraction apparatus to extract program-associated information from a broadcasting stream;
a user viewing behavior analyzing apparatus to generate a stream analyzing command to analyze an video/audio stream and metadata based on user interaction by matching manipulation information of the user with the program-associated information extracted by the program information extraction apparatus and with the video/audio stream or the metadata;
a stream analyzing apparatus to generate scene analyzing information by selectively parsing the broadcasting stream according to the stream analyzing command generated by the user viewing behavior analyzing apparatus; and
a control-information generating apparatus to automatically generate replay control information to control a plurality of modes for the broadcasting stream that is to be recorded without a user's input by matching the scene analyzing information of the stream analyzing apparatus with the stream analyzing command of the user viewing behavior analyzing apparatus.

15. The apparatus of claim 14, further comprising:
a storage apparatus to store the replay control information linked to the broadcasting stream.

16. The apparatus of claim 14, further comprising:
a display apparatus to display the replay control information in real time while replaying the broadcasting stream.

17. The apparatus of claim 14, wherein the stream analyzing apparatus comprises:
a metadata analyzer to selectively parse description information according to the stream analyzing command;
a video analyzer to selectively parse video of the broadcasting stream according to the stream analyzing command;
an audio analyzer to selectively parse audio of the broadcasting stream according to the stream analyzing command.

18. A personal video recording apparatus, comprising:
a personal video recording unit to record content information from a received broadcast stream; and
a processing unit to process customized content information corresponding to the recorded content information, the processing unit to extract user interaction information by matching broadcasting-associated additional information with one or more viewing preferences of a user and to generate a stream analyzing command to analyze an video/audio stream and a metadata by matching results of viewing behavior analysis with the video/audio stream or the metadata,
wherein the customized content information is processed by automatically generating customized replay control information without a user's input while the content information is being recorded according to the generated stream analyzing command.

19. A method of processing customized recording contents, the method comprising:
receiving content information in a broadcast signal;
extracting one or more of electronic program guide (EPG) information and metadata from the received content information with a program information extraction unit and generating a stream analyzing command to analyze an video/audio stream and the metadata by matching results of viewing behavior analysis with the video/audio stream or the metadata;
analyzing user viewing behavior using at least one of the EPG information and one or more preferences of a viewing behavior of a user to generate user interaction information with a user behavior analyzing unit;
analyzing the video/audio stream of at least one of the received content information and the metadata according to the stream analyzing command based on the user interaction information with a stream analyzing unit; and
automatically generating replay control information with a control-information generating unit at a time of recording without the user's input according to the analyzed video/audio stream to control a plurality of modes.

20. The method of claim 19, wherein the replay control information is generated based on at least one of a user preference using the video/audio stream information and the user interaction information, and by matching the analyzed metadata with the user interaction information.

21. The method of claim 19, further comprising:
separately storing the content information and the replay control information in a storage medium.

22. The method of claim 19, wherein the content information comprises:
a format of a broadcasting stream encoded in MPEG.

23. The method of claim 19, wherein the user viewing behavior is analyzed with the user behavior analyzing unit using at least one of a statistical framework and a rule-based framework, each based on a history of programs previously watched by the user.

24. A non-transitory computer-readable recording medium having embodied thereon a computer program to execute a method, wherein the method comprises:
receiving content information;
extracting one or more of EPG information and metadata from the received content information and generating a stream analyzing command to analyze an video/audio stream and the metadata by matching results of viewing behavior analysis with the video/audio stream or the metadata;
analyzing user viewing behavior using at least one of the EPG information and one or more preferences of a viewing behavior of a user to generate user interaction information according to the stream analyzing command;
analyzing a video/audio stream of at least one of the received content information and the metadata according to a stream analyzing command based on the user interaction information; and
automatically generating replay control information at a time of recording without a user's input according to the analyzed video/audio stream to control a plurality of modes.

* * * * *